UNITED STATES PATENT OFFICE.

FRANK J. TONE, OF NIAGARA FALLS, NEW YORK.

GRAPHITE ARTICLE AND METHOD OF MAKING THE SAME.

977,984. Specification of Letters Patent. Patented Dec. 6, 1910.

No Drawing. Application filed November 11, 1905. Serial No. 286,809.

*To all whom it may concern:*

Be it known that I, FRANK J. TONE, of Niagara Falls, Niagara county, New York, have invented a new and useful Improvement in Graphite Articles and Methods of Making the Same, of which the following is a full, clear, and exact description.

My invention relates to the manufacture of graphite articles from that form of graphite which is produced in electric furnaces. This form of graphite, which I designate hereinafter as electrically produced graphite, is formed by the decomposition of carbids, carbon being first caused to combine with a metallic element to form a carbid which is subsequently decomposed by sufficient elevation of temperature, the metallic element being driven off as vapor and the carbon left in the form of graphite. I have discovered that graphite formed in this manner has an openness of structure and a uniformity of porosity which gives it peculiar properties not found in other forms of graphite. This I attribute largely to its fine state of sub-division, due to the complete breaking up of each molecule of the carbid, apparently without fusion. Among these peculiar properties I have discovered that it can be compressed into a greatly reduced volume, and that when so compressed it becomes very dense. It can be molded easily into forms of considerable mechanical strength, by the cohesion of its particles without the addition of a foreign binding material.

In making graphite articles in accordance with my invention, I place this electrically produced graphite in a mold and subject the same to pressure. The degree of pressure depends largely upon the purpose of the article to be formed, but I prefer to use a pressure of ten tons and upward per square inch, in order to secure proper density of the material and to give the formed article the necessary strength. For some purposes, however, where great strength is not required a pressure of one ton per square inch would be sufficient.

Graphite articles made according to this method possess great advantage over the ordinary electrically graphitized carbons in that they are of much greater density and possess a much higher electro-conductivity. Thus an ordinary graphitized carbon, has a density of about 1-7/10 grams per cubic centimeter, while compressed graphite articles made in accordance with my invention may have a density as high as 2-2/10 grams per cubic centimeter. These properties render my invention of great importance in the manufacture of motor brushes, battery plates, and various other articles for which graphite is employed. It is also particularly adapted for use in the manufacture of molds for casting metals. For this purpose it is molded over the pattern in the usual way, but under high pressure. Castings made from molds so formed have smooth surface and sharp outlines or definition. The molds may also be used several times without renewing.

What I claim is:—

1. As a new article of manufacture, artificial graphite in the state of molecular separation, and characterized by a density of approximately two and two-tenths grams per cubic centimeter; substantially as described.

2. As a new article of manufacture, an electric conductor composed of artificial graphite in the state of molecular separation, and characterized by a density of approximately two and two-tenths grams per cubic centimeter and having high electrical conductivity; substantially as described.

3. As a new article of manufacture, a shaped article composed of artificial graphite in the state of molecular separation, and characterized by a density of approximately two and two-tenths grams per cubic centimeter; substantially as described.

4. A new article of manufacture, consisting of artificial graphite in the state of molecular separation, and distinguished from electrically graphitized carbon in the characteristics of greater density and higher electrical conductivity its density being in excess of two grams per cubic centimeter; substantially as described.

5. As a new article of manufacture, artificial graphite characterized by a density exceeding two grams per cubic centimer: substantially as described.

In testimony whereof, I have hereunto set my hand.

FRANK J. TONE.

Witnesses:
ARTHUR BATTS,
FRED I. PIERCE.